Figure 5:
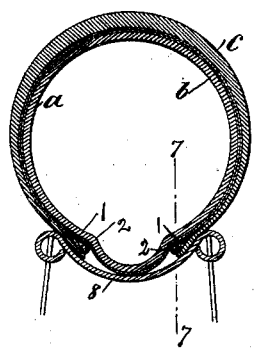
Figure 6:
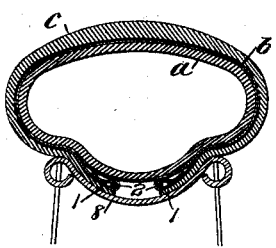

(No Model.) 2 Sheets—Sheet 1.
L. J. PHELPS.
PNEUMATIC TIRE.
No. 482,487. Patented Sept. 13, 1892.
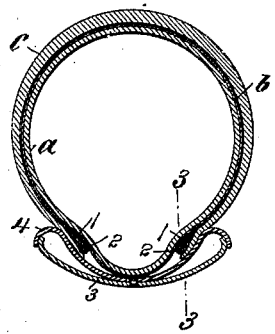
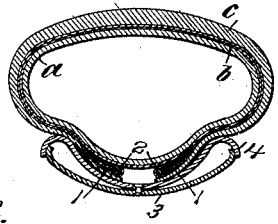
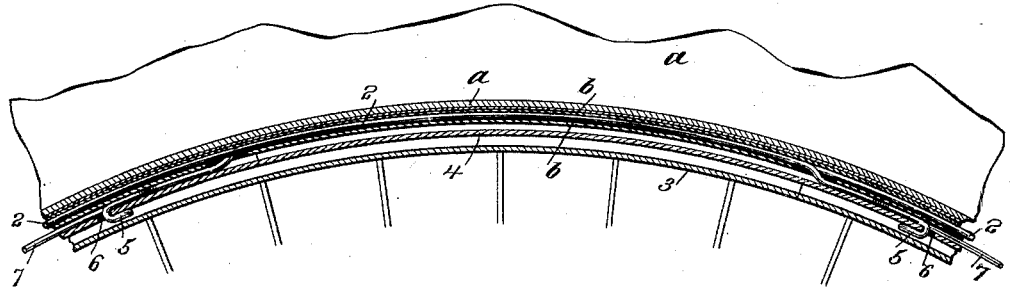
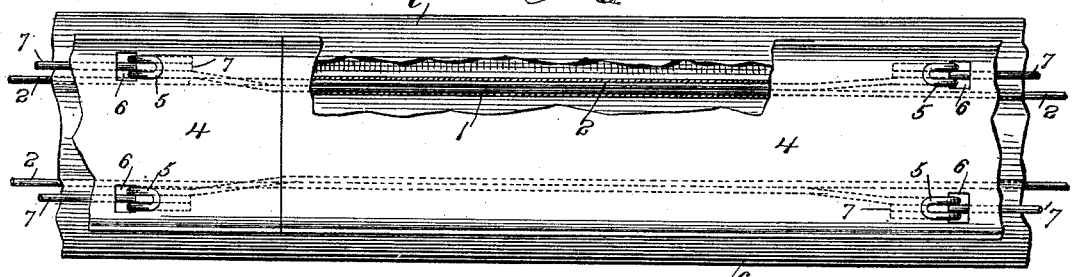
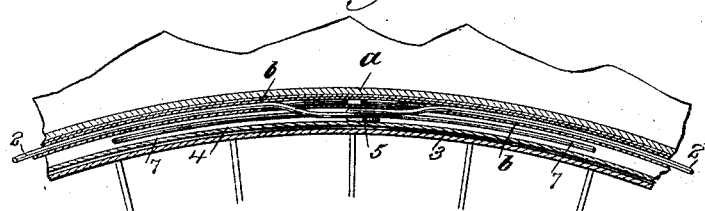
Attest:
G. H. Botts.
C. J. Sawyer.
Inventor
Lucius J. Phelps
by
Philipp Munson & Phelps
Attys (No Model.) 2 Sheets—Sheet 2.

L. J. PHELPS.
PNEUMATIC TIRE.

No. 482,487. Patented Sept. 13, 1892.

Attest:
Geo. H. Botts.
C. J. Sawyer

Inventor:
Lucius J. Phelps
by
Phelps Munson & Phelps
Attys

UNITED STATES PATENT OFFICE.

LUCIUS J. PHELPS, OF PASSAIC, NEW JERSEY.

PNEUMATIC TIRE.

SPECIFICATION forming part of Letters Patent No. 482,487, dated September 13, 1892.

Application filed February 27, 1892. Serial No. 422,976. (No model.)

*To all whom it may concern:*

Be it known that I, LUCIUS J. PHELPS, a citizen of the United States, residing at Passaic, county of Passaic, and State of New Jersey, have invented certain new and useful Improvements in Pneumatic Tires, fully described and represented in the following specification and the accompanying drawings, forming a part of the same.

This invention relates to wheel-tires, and especially to tires of that class now in common use on bicycles and tricycles, consisting of a cylinder of hard rubber or similar material inclosing a rubber inflation-tube and known as "pneumatic tires."

In pneumatic tires it is necessary that the inflation-tube should be convenient of access in order that repairs may readily be made, and for this and other purposes the outer envelope or tire proper has been made separate from the inflation-tube and open longitudinally when applied, and many devices have been used for securing the edges of the envelope upon either the inner or outer face of the rim, so that it may readily be removed therefrom.

One object of my invention is to provide an improved pneumatic tire in which the envelope shall be firmly held in place upon the rim during use and may readily and conveniently be removed and replaced without the aid of an expert for the purpose of repairs to the inflation-tube or renewal of the envelope when the latter is worn out. In securing this object I provide the two edges of the envelope with wires of sufficient length to extend entirely about the outer face of the rim when the envelope is in place thereon and bind the envelope on the rim by securing the ends of the wires to the rim and drawing the wires tight. The rim is made concave on its outer surface, so as to form inclined surfaces, on which the wires lie and up which they are drawn as the edges of the envelope are forced outward, so that the wires are tightened to secure the envelope by inflating the tire, and pressure on the tire only binds the envelope more firmly on the rim by drawing the edges outward and tightening the wires.

The wires may be attached to the edges of the envelope in any suitable manner, but are preferably loose therein, so as to permit the free movement of the wires longitudinally of the envelope, in order that the wires may be tightened and slackened independently of the envelope.

While it may not be found absolutely necessary that the wires should be loose in the edges of the envelope, this is an important feature of my preferred construction, as otherwise the range of tightening and loosening of the wires is limited by the stretch of the envelope. I prefer to attach my wires to the envelope by forming hems in the canvas lining at each edge of the envelope, into which the wires are threaded, the wires thus being loose and free to move in the envelope and at the same time lying at the extreme inner edges of the same, so as to lie near the center of the rim when the uninflated tire is applied, thus giving a space for the outward movement of the wires in tightening. The wires may be single strands or formed in any suitable manner so as to have the requisite strength and flexibility and are preferably of brass or copper to avoid rusting. As above stated, the ends of the wires are secured to the rim, as this avoids creeping of the wires in the edges of the envelope and aids in holding the tire in place longitudinally of the rim, and the wires may be secured more conveniently by securing one end of the wire to the rim and then pulling up the other and securing the latter. A solid rim may be used and the wires secured to the outer face of the same, or the ends of the wires may be extended through openings in the rim and secured to the inner face. I prefer, however, to use a hollow rim and to secure the wires in place by providing the ends with hooks or equivalent means held between the inner and outer plates of the rim, so that no part of the device for securing the envelope shows outside the tire or rim.

A further object of my invention is to provide a simple, cheap, and efficient construction of hollow rim especially adapted for use with my improved means for securing the envelope, but of general application in similar constructions. I attain this object by forming the rim of two independent plates of metal having their ends united in forming the rim and placed together so as to break joints. These plates are bent transversely, so as to form convex and concave inner and outer faces of the rim, the plate forming the outer face of the rim being bent on a curve of shorter radius than the plate forming the inner face, so as to form a space between the two plates on each side of the central line, and having its edges curved around the edges of the plate forming the outer face, the latter plate being sprung into position within the curved edges of the former and the plates being secured together by riveting on the central line. This construction forms a very strong and cheap hollow rim having the rounded edges, which, especially in pneumatic-tire constructions, are desirable to prevent wear of the tire as it is pressed over the edges.

For a full understanding of my invention a detailed description of a construction embodying the same in its preferred form and certain modifications thereof will now be given, reference being had to the accompanying drawings, forming a part of this specification, in which—

Figure 7:
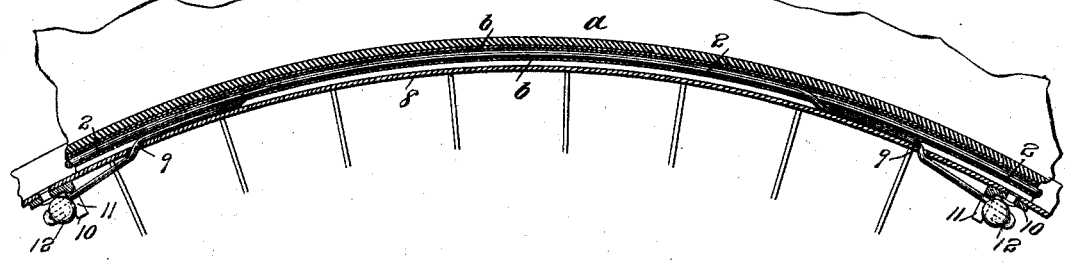
Figure 8:
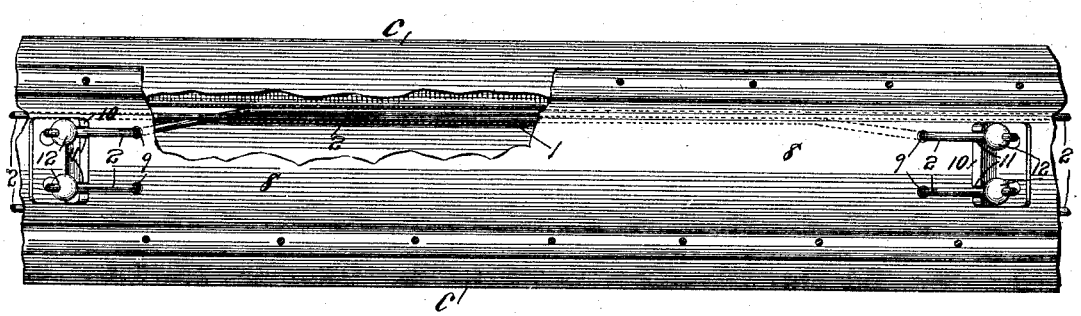
Figure 11:
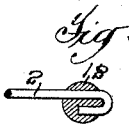

Figure 1 is a cross-section of a wheel rim and tire constructed in accordance with my invention, the tire being shown inflated. Fig. 2 is a similar view showing the uninflated tire as applied. Fig. 3 is a longitudinal section of the tire on the line 3 of Fig. 1. Fig. 4 is a plan view of the inner side of the tire with the rim partially broken away and the edge of the envelope shown partly in section. Figs. 5 to 8 show the tire applied to a solid rim, with the ends of the wires passed through the rim and secured upon its inner face, these views corresponding, respectively, to Figs. 1 to 4. Fig. 9 is a view similar to Figs 3 and 7, showing the wires secured by uniting their ends. Fig. 10 is a detail of the hook construction. Fig. 11 is a detail of the wire-and-ball connection.

Referring to said drawings, the inflation-tube in the form shown consists of the inner tube $a$, forming the air-chamber of the tire, and a cover $b$ for the same, formed, preferably, of strong canvas, this cover fully inclosing the tube $a$, so as to keep it in proper place and prevent bursting. The tire-envelope or tire proper $c$ may be of any suitable material, a vulcanized canvas-lined rubber cylinder of graduated thickness being usually employed, this envelope inclosing the inflation-tube and being preferably secured to the rim. The edges of the envelope are provided with hems 1, made by folding back the inner edges of the canvas lining to the envelope and securing them by stitching or cementing, and into these hems are threaded the wires 2, by which the envelope is secured to the rim.

In the construction shown in Figs. 1 to 4, in which the improvements forming my invention are shown in their preferred form, a hollow rim is used, which is formed, preferably, of two plates 3 4, forming, respectively, the inner and outer faces of the rim, these plates being curved, so as to provide spaces between them on each side of the central line, and secured together, preferably, by riveting on the central line and by springing the outer edges of the plate 3 within the edges of the plate 4, which are curved over them. The wires are preferably made longer than the envelope, so as to overlap for a short distance inside the hems, as shown in Figs. 3 and 4, and the ends of the wires are passed through openings in the hems and provided with hooks 5, by which the ends are secured in openings 6 in the plate 4 of the rim. The wires are preferably extended beyond the hooks 5 a sufficient distance to give a strong hold for drawing up the wires in hooking them to the rim. These extended wires may be integral with the wires 2 and the hooks 5 be formed in any suitable manner; but I have shown a simple construction in which the hooks are formed in the doubled ends of the wire and independent wires 7 are soldered in with the doubled portions and extended beyond the hooks the required distance.

In applying the tire to the rim the tire is first placed upon the outer surface of the rim uninflated, and the wires 2 are then drawn up tight by the end wires 7 and hooked to the rim by passing hooks 5 through openings 6 in plate 4. The edges of the envelope now lie quite close to each other and the wires 2 lie on the lower parts of the inclined surface formed on the outer face of the plate, as shown in Fig. 2.

On the inflation of the tire the edges of the envelope are forced outward by the expansion of the inflation-tube and the wires 2 are drawn up the inclined surfaces formed on plate 4, so that the circumference of the circles formed by the surfaces with which the wires are in engagement is constantly increased and the wires gradually tightened by the strain thus put upon them. When the tire is fully inflated, as shown in Fig. 1, the wires have been forced up the inclined surfaces on plate 4, so as to be strained tightly, and the envelope is thus firmly secured in position.

In Figs. 5 to 8 is shown a similar construction, except that the rim consists of a single plate 8, which is provided with openings 9, through which the ends of the wires are passed for securing them to the rim. The rim is provided on its inner face with plates 10, projecting from the inner side of the rim and having slots 11, into which the ends of the wires 1 are passed inside balls 12, secured to the ends of the wires, which are thus held, as by hooks 5 in the construction previously described, the balls being substituted for the hooks and made removable, in order that the wires may be passed through small openings in the rim. The balls 12 may be secured to the wires 2 in any suitable manner; but I have shown in Fig. 11 a simple construction, which is preferably used, the wire 2 being passed through a hole in the ball 12 and the end returned into a second hole therein. The ball is thus held strongly, while it may readily be moved by straightening out the returned end of the wire 2. In this construction the tire is first applied to the rim, the ends of the wires 2 passed through the openings 9 to the inner side of the rim, and the balls 12 then secured upon the ends of the wires and the latter secured and tightened, as previously described.

In Fig. 9 I have shown a construction in which the ends of the wires are not secured to the rim, but secured together by means of a hook 13 and eye 14, formed on or secured to the ends of the wires, the end wires 7 being preferably used, as in the construction shown in Figs. 1 to 4. It will be understood that with the tire shown in Fig. 9 it is necessary only to apply the tire to the rim uninflated and then to connect the ends of the wires 2 and inflate the tire, when the wires will be forced outward up the inclined surfaces of the outer side of the rim and tightened, as in the constructions previously described.

It will be seen that my invention provides a very simple, cheap, and efficient construction in which the tire is firmly held on the rim and all pressure on the tire tends to tighten the envelope.

While I have applied the term "wire" to the strand by which the envelope is secured, it will be understood that any suitable non-elastic material may be used, and the term "wire" is intended to include such equivalents.

The invention is shown as applied to a compound pneumatic tire having the inflation-tube and envelope separate; but it will be understood that the invention is applicable generally to pneumatic tires in which the envelope is open longitudinally, whether the air-chamber be formed by a tube separate from the envelope or not. While I have shown and described only the preferred means for carrying out my invention and certain modifications thereof, it is obvious that many other modifications may be made therein by those skilled in the art without departure from my invention.

What I claim is—

1. The combination, with a hollow rim having surfaces inclined upward and outward on each side of the outer face of the rim, of a pneumatic tire secured on the outer side of said rim by wires carried by but loose in the edges of the envelope and lying on the inclined surfaces of the rim and having their ends secured through the outer plate of the rim, substantially as described.

2. The combination, with a rim having surfaces inclined upward and outward on each side of the outer face of the rim, of a pneumatic tire secured on the outer side of said rim by wires carried by but loose in the edges of the envelope and lying on the inclined surfaces of the rim, said wires having their ends secured to the rim by hooks or equivalent means and provided with extensions beyond the hooks for drawing up the wires, substantially as described.

3. The combination, with a rim having surfaces inclined upward and outward on each side of the outer face of the rim, of a pneumatic tire secured on the outer sides of said rim by wires carried by the edges of the envelope and lying on the inclined surfaces of the rim, said wires having their ends secured to the rim by hooks or equivalent means and provided with extensions beyond the hooks for drawing up the wires, substantially as described.

4. A hollow wheel-rim consisting of the plates 3 4, riveted together on the central line and having the edges of the plate 3 sprung within the curved overedges of the plate 4, substantially as described.

In testimony whereof I have hereunto set my hand in the presence of two subscribing witnesses.

L. J. PHELPS.

Witnesses:
T. F. KEHOE,
C. J. SAWYER.